(12) United States Patent
Lindholm

(10) Patent No.: US 7,859,548 B1
(45) Date of Patent: Dec. 28, 2010

(54) OFFLOADING CUBE MAP CALCULATIONS TO A SHADER

(75) Inventor: John Erik Lindholm, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 746 days.

(21) Appl. No.: 11/551,176

(22) Filed: Oct. 19, 2006

(51) Int. Cl.
*G09G 5/00* (2006.01)
(52) U.S. Cl. .................. 345/582; 345/426; 345/506
(58) Field of Classification Search .......... 345/419, 345/582
See application file for complete search history.

(56) References Cited

U.S. PATENT DOCUMENTS

| | | | |
|---|---|---|---|
| 5,020,115 A | 5/1991 | Black | |
| 5,969,726 A | 10/1999 | Rentschler et al. | |
| 6,232,981 B1* | 5/2001 | Gossett | 345/582 |
| 6,463,527 B1 | 10/2002 | Vishkin | |
| 6,470,443 B1 | 10/2002 | Emer et al. | |
| 6,477,562 B2 | 11/2002 | Nemirovsky et al. | |
| 6,567,839 B1 | 5/2003 | Borkenhagen et al. | |
| 6,593,923 B1* | 7/2003 | Donovan et al. | 345/422 |
| 6,630,935 B1 | 10/2003 | Taylor et al. | |
| 6,731,288 B2* | 5/2004 | Parsons et al. | 345/502 |
| 6,731,289 B1 | 5/2004 | Peercy et al. | |
| 6,876,362 B1* | 4/2005 | Newhall et al. | 345/426 |
| 6,894,687 B1* | 5/2005 | Kilgard et al. | 345/419 |
| 7,015,913 B1 | 3/2006 | Lindohlm et al. | |
| 7,096,470 B2 | 8/2006 | Brown et al. | |
| 7,136,071 B1* | 11/2006 | Donovan et al. | 345/582 |
| 7,324,113 B1* | 1/2008 | Rouet et al. | 345/522 |
| 2003/0041173 A1 | 2/2003 | Hoyle | |
| 2004/0183801 A1* | 9/2004 | Deering | 345/441 |
| 2004/0216106 A1 | 10/2004 | Kalla et al. | |
| 2005/0122330 A1* | 6/2005 | Boyd et al. | 345/501 |
| 2005/0138328 A1 | 6/2005 | Moy et al. | |
| 2006/0004995 A1 | 1/2006 | Hetherington et al. | |
| 2006/0136919 A1 | 6/2006 | Aingaran et al. | |
| 2008/0024491 A1* | 1/2008 | Sathe et al. | 345/421 |

OTHER PUBLICATIONS

Randi J. Rost, OpenGL Shading Language, Jan. 25, 2006, Addison-Wesley Professional, Second Edition, Chapters 2,3,7,8 and 10.*
Eggers, et al. "Simultaneous Multithreading: A Platform for Next-Generation Processors," *IEEE Micro*, vol. 17, No. 5, pp. 12-19, Sep./Oct. 1997.

\* cited by examiner

*Primary Examiner*—Antonio A Caschera
(74) *Attorney, Agent, or Firm*—Patterson & Sheridan, LLP

(57) ABSTRACT

Systems and methods for performing cube mapping computations using a shader program may reduce the need for fixed function cube mapping computation units in graphics processors. Therefore, die area is used more efficiently since a general purpose processing unit may be configured using shader program instructions to perform the cube mapping computations and other computations. The general purpose processing unit is configured to perform floating point computations to identify the cube map face that will be read and process the cube map coordinates. A fixed function unit is also configured to identify the cube map face that will be read to avoid passing the cube map face information from the general purpose processing unit to the fixed function unit.

20 Claims, 6 Drawing Sheets

OFFLOADING CUBE MAP CALCULATIONS TO A SHADER

BACKGROUND OF THE INVENTION

1. Field of the Invention

One or more aspects of the present invention relate generally to computer generated graphics, and more particularly to processing cube map coordinates.

2. Description of the Related Art

In conventional graphics processing, the processing of cube map coordinates may be performed using dedicated fixed function processing units specifically designed to perform cube mapping computations. These dedicated fixed function processing units are idle when cube mapping operations are not used, decreasing the efficiency of the graphics processor since the die area used for the dedicated fixed function processing unit is not available for use by a general purpose processing unit that may be used to perform a variety of computations.

Accordingly, it is desirable to perform cube map computations using a general purpose processing unit that is capable of executing shader program instructions rather than using a dedicated fixed function processing unit that is configured to only perform cube map computations.

SUMMARY OF THE INVENTION

Systems and methods for performing cube mapping computations using a shader program may reduce the need for fixed function cube mapping computation units in graphics processors. Therefore, graphics processor die area is used more efficiently since a general purpose processing unit may be configured using shader program instructions to perform the cube mapping computations and other computations. A compiler may be used to replace cube map specific texture calls for execution by a dedicated fixed function cube map processing unit with shader program instructions for execution by the general purpose processing unit.

Various embodiments of a method of the invention for compiling program instructions to compute cube map coordinates using a shader include identifying a texture call for reading cube map data from a cube map using cube map coordinates and replacing the texture call with a first sequence of shader program instructions to produce the cube map coordinates and a shader program instruction to read the cube map data from the face of the cube map, wherein a fixed function unit is configured to identify the face of the cube map when the first sequence of shader program instructions is executed by a general purpose programmable floating point unit.

Various embodiments of a method of the invention for computing cube map coordinates using a shader include receiving source cube map coordinates, executing a first set of shader program instructions, executing a second set of shader program instructions, and identifying a face of a cube map using a fixed function processing unit when a general purpose floating point unit produces the cube map coordinates. The first set of shader program instructions is executed using the general purpose floating point unit within the shader to determine a maximum absolute value of the source cube map coordinates to identify the face of the cube map. The second set of shader program instructions is executed using the general purpose floating point unit to process the source cube map coordinates and the maximum absolute value, and produce cube map coordinates for reading cube map data from the face of the cube map.

Various embodiments of the invention include a system for computing cube map coordinates using shader program instructions including a general purpose programmable floating point unit and a fixed function processing unit. The general purpose programmable floating point unit is configured to receive source cube map coordinates and execute a first portion of the shader program instructions to produce the cube map coordinates for reading cube map data from a face of a cube map. The fixed function processing unit is coupled to the general purpose programmable floating point unit and configured to identify the face of the cube map used to read the cube map data when the general purpose programmable floating point unit outputs the cube map coordinates.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The die area of a graphics processor may be used more efficiently when cube mapping computations are performed by a general purpose processing unit that is configured using shader program instructions to perform the cube mapping computations and other computations. The shader program instructions configure a general purpose processing unit to identify the cube map face that will be read and process the cube map coordinates. A fixed function unit is also configured to identify the cube map face that will be read to avoid passing the cube map face information from the general purpose processing unit to the fixed function unit. The cube map coordinate processing is distributed between the fixed function unit and the general purpose processing unit without requiring any dedicated circuitry for performing cube mapping operations.

Figure 1:
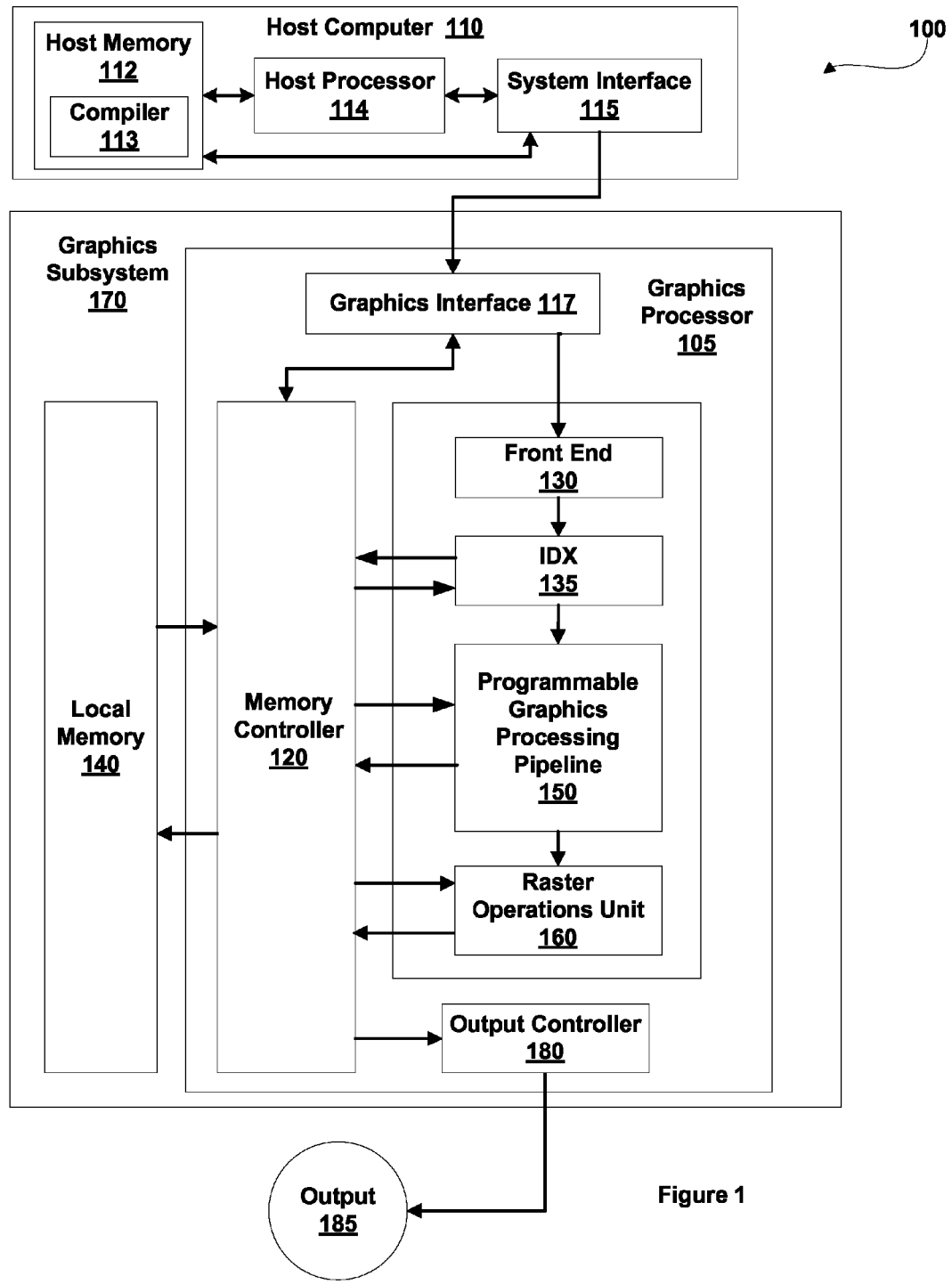
FIG. 1 illustrates one embodiment of a computing system according to the invention including a host computer and a graphics subsystem in accordance with one or more aspects of the present invention.

FIG. 1 is an illustration of a computing system generally designated 100 and including a host computer 110 and a graphics subsystem 170. Computing system 100 may be a desktop computer, server, laptop computer, palm-sized computer, tablet computer, game console, cellular telephone, computer based simulator, or the like. Host computer 110 includes host processor 114 that may include a system memory controller to interface directly to host memory 112 or may communicate with host memory 112 through a system interface 115. System interface 115 may be an I/O (input/output) interface or a bridge device including the system memory controller to interface directly to host memory 112.

A compiler 113 may be stored in host memory 112 for execution by host processor 114. Compiler 113 processes program instructions to produce microcode, i.e., shader program instructions, for execution by graphics processor 105. In particular, compiler 113 produces microcode based on the specific capabilities of the graphics processor that will execute the microcode. For example, when dedicated cube map processing units are available, specific cube map calls may be used in the microcode. In embodiments of the present invention, specific cube map calls are replaced with shader program instructions for execution by a general purpose processing unit. Although computing system 100 includes compiler 113 and graphics subsystem 170, in other embodiments of the present invention, compiler 113 may be executed in a computing system that does not include graphics subsystem 170.

Host computer 110 communicates with graphics subsystem 170 via system interface 115 and a graphics interface 117 within a graphics processor 105. Data received at graphics interface 117 can be passed to a front end 130 or written to a local memory 140 through memory controller 120. Graphics processor 105 uses graphics memory to store graphics data and program instructions, where graphics data is any data that is input to or output from components within the graphics processor. Graphics memory can include portions of host memory 112, local memory 140, register files coupled to the components within graphics processor 105, and the like.

Graphics processor 105 includes, among other components, front end 130 that receives commands from host computer 110 via graphics interface 117. Front end 130 interprets and formats the commands and outputs the formatted commands and data to an IDX (Index Processor) 135. Some of the formatted commands are used by programmable graphics processing pipeline 150 to initiate processing of data by providing the location of program instructions or graphics data stored in memory. IDX 135, programmable graphics processing pipeline 150 and a raster operations unit 160 each include an interface to memory controller 120 through which program instructions and data can be read from memory, e.g., any combination of local memory 140 and host memory 112.

IDX 135 optionally reads processed data, e.g., data written by raster operations unit 160, from memory and outputs the data, processed data and formatted commands to programmable graphics processing pipeline 150. programmable graphics processing pipeline 150 and raster operations unit 160 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. programmable graphics processing pipeline 150 and raster operations unit 160 are each optionally configured such that data processing operations are performed in multiple passes through those units or in multiple passes within programmable graphics processing pipeline 150. Programmable graphics processing pipeline 150 and a raster operations unit 160 also each include a write interface to memory controller 120 through which data can be written to memory.

In a typical implementation programmable graphics processing pipeline 150 performs geometry computations, rasterization, and pixel computations. Therefore, programmable graphics processing pipeline 150 is programmed to operate on surface, primitive, vertex, fragment, pixel, sample or any other data. For simplicity, the remainder of this description will use the term "samples" to refer to graphics data such as surfaces, primitives, vertices, pixels, fragments, or the like.

Samples output by programmable graphics processing pipeline 150 are passed to a raster operations unit 160, which optionally performs near and far plane clipping and raster operations, such as stencil, z test, and the like, and saves the results or the samples output by programmable graphics processing pipeline 150 in local memory 140. When the data received by graphics subsystem 170 has been completely processed by graphics processor 105, an output 185 of graphics subsystem 170 is provided using an output controller 180. Output controller 180 is optionally configured to deliver data to a display device, network, electronic control system, other computing system 100, other graphics subsystem 170, or the like. Alternatively, data is output to a film recording device or written to a peripheral device, e.g., disk drive, tape, compact disk, or the like.

Figure 2:
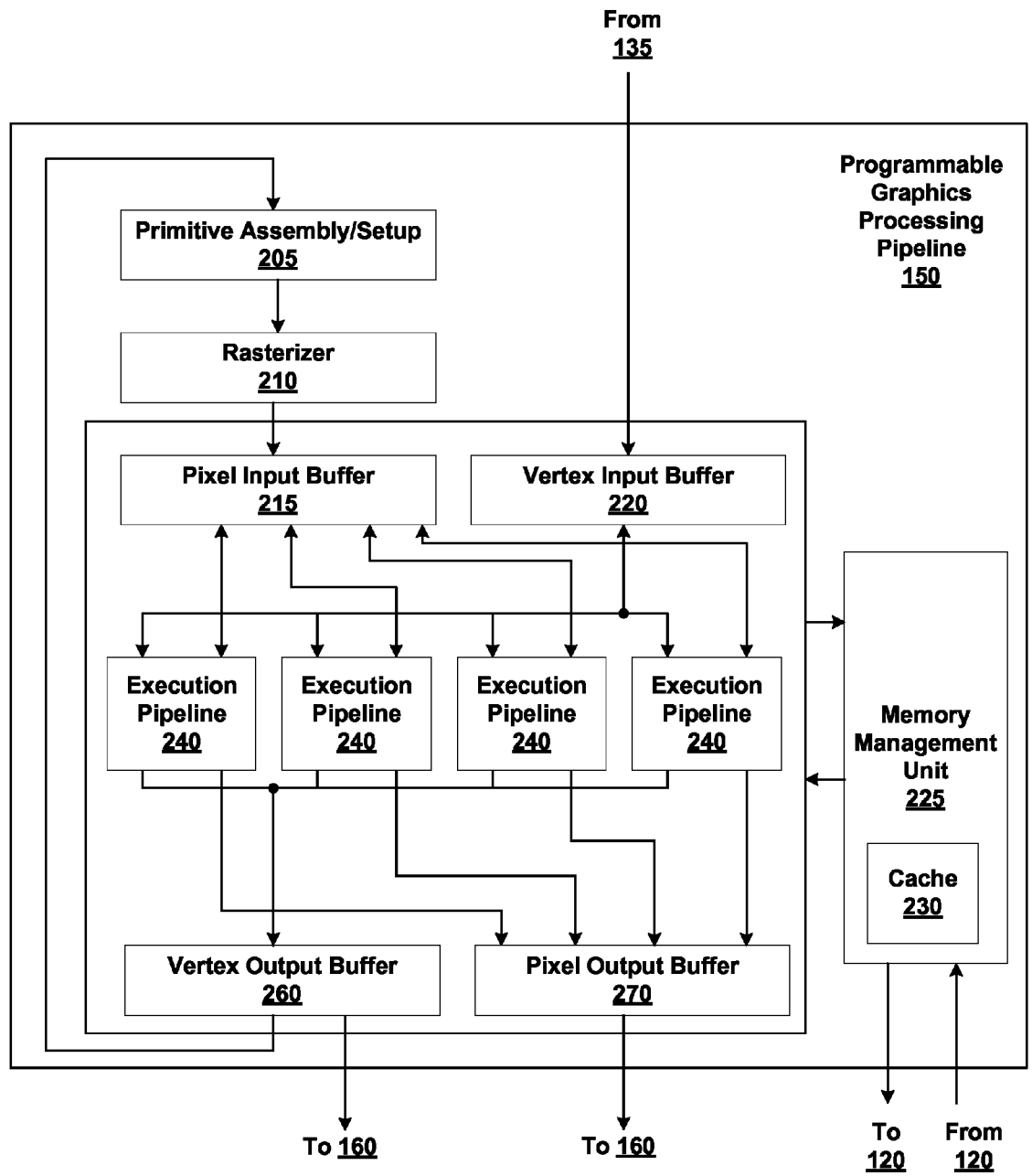
FIG. 2 is a block diagram of an embodiment of the programmable graphics processing pipeline of FIG. 1 in accordance with one or more aspects of the present invention.

FIG. 2 is an illustration of programmable graphics processing pipeline 150 of FIG. 1. At least one set of samples is output by IDX 135 and received by programmable graphics processing pipeline 150 and the at least one set of samples is processed according to at least one program, the at least one program including graphics program instructions. A program can process one or more sets of samples. Conversely, a set of samples can be processed by a sequence of one or more programs.

Samples, such as surfaces, primitives, or the like, are received from IDX 135 by programmable graphics processing pipeline 150 and stored in a vertex input buffer 220 including a register file, FIFO (first in first out), cache, or the like (not shown). The samples are broadcast to execution pipelines 240, four of which are shown in the figure. Each execution pipeline 240 includes at least one multithreaded processing unit, as described in conjunction with FIG. 3. The samples output by vertex input buffer 220 can be processed by any one of the execution pipelines 240. A sample is accepted by an execution pipeline 240 when a processing thread within the execution pipeline 240 is available as described further herein. Each execution pipeline 240 signals to vertex input buffer 220 when a sample can be accepted or when a sample cannot be accepted. In one embodiment of the present invention, programmable graphics processing pipeline 150 includes a single execution pipeline 240 containing one multithreaded processing unit. In an alternative embodiment of the present invention, programmable graphics processing pipeline 150 includes a plurality of execution pipelines 240.

Execution pipelines 240 may receive first samples, such as higher-order surface data, and tessellate the first samples to generate second samples, such as vertices. Execution pipelines 240 may be configured to transform the second samples from an object-based coordinate representation (object space) to an alternatively based coordinate system such as world space or normalized device coordinates (NDC) space. Each execution pipeline 240 may communicate with memory management unit 225 using a read interface (not shown in FIG. 2) to read program instructions and graphics data such as texture maps from local memory 140 or host memory 112 via memory controller 120 and a cache 230. Cache 230 is used to improve memory read performance by reducing read latency. In an alternate embodiment cache 230 is omitted. In another alternate embodiment, a memory management unit 225 is included in each execution pipeline 240. In another alternate embodiment program instructions are stored within programmable graphics processing pipeline 150. In another alternate embodiment each execution pipeline 240 has a dedicated instruction read interface to read program instructions from local memory 140 or host memory 112 via memory controller 120.

Execution pipelines 240 output processed samples, such as vertices, that are stored in a vertex output buffer 260 including a register file, FIFO, cache, or the like (not shown). Processed vertices output by vertex output buffer 260 are received by a primitive assembly/setup unit 205. Primitive assembly/setup unit 205 calculates parameters, such as plane equation coefficients, to rasterize the processed vertices and outputs parameters and samples, such as vertices, to a rasterizer 210. Rasterizer 210 performs scan conversion on samples, such as vertices, and outputs samples, such as fragments, to a pixel input buffer 215. Alternatively, rasterizer 210 resamples processed vertices and outputs additional vertices to pixel input buffer 215.

Pixel input buffer 215 outputs the samples to each execution pipeline 240. Samples, such as pixels and fragments, output by pixel input buffer 215 are each processed by only one of the execution pipelines 240. Pixel input buffer 215 determines which one of the execution pipelines 240 to output each sample to depending on an output pixel position, e.g., (x,y), associated with each sample. In this manner, each sample is output to the execution pipeline 240 designated to process samples associated with the output pixel position. In an alternate embodiment of the present invention, each sample output by pixel input buffer 215 is processed by one of any available execution pipelines 240.

Each execution pipeline 240 signals to pixel input buffer 215 when a sample can be accepted or when a sample cannot be accepted. Program instructions configure a shader within an execution pipeline 240 to perform operations such as tessellation, perspective correction, texture mapping, shading, blending, and the like.

Processed samples are output from each execution pipeline 240 to a pixel output buffer 270. Pixel output buffer 270 optionally stores the processed samples in a register file, FIFO, cache, or the like (not shown). The processed samples are output from pixel output buffer 270 to raster operations unit 160.

Figure 3:
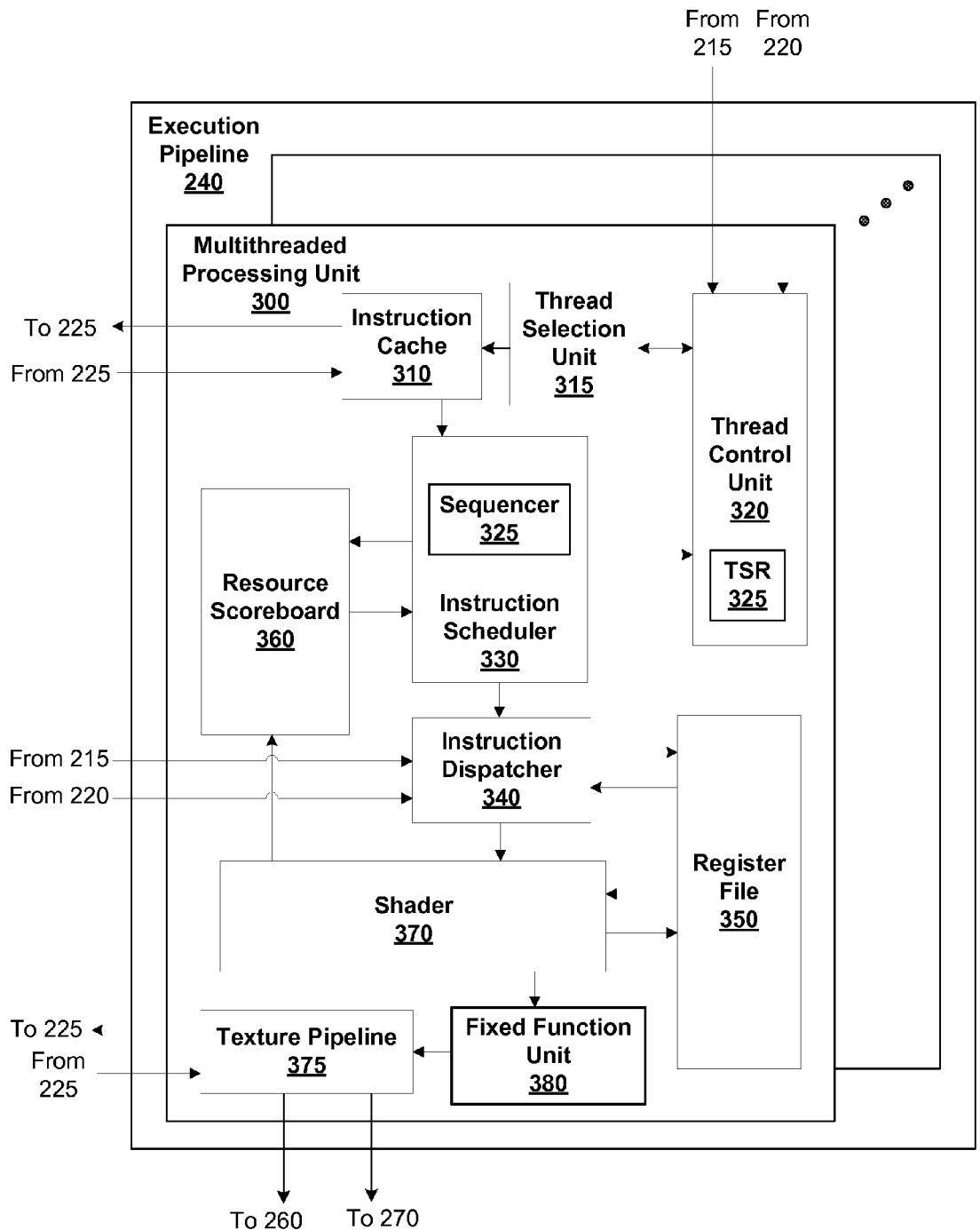
FIG. 3 is a block diagram of an embodiment of the execution pipeline of FIG. 1 in accordance with one or more aspects of the present invention.

FIG. 3 is a block diagram of an embodiment of execution pipeline 240 of FIG. 1 including at least one multithreaded processing unit 300. An execution pipeline 240 can contain a plurality of multithreaded processing units 300, each multithreaded processing unit 300 containing at least one shader 370. Shader 370 is configured using program instructions read by a thread control unit 320 via memory management unit 225. Thread control unit 320 gathers source data specified by the program instructions and dispatches the source data and program instructions to shader 370. Shader 370 performs computations specified by the program instructions and outputs data to at least one destination, e.g., pixel output buffer 270, vertex output buffer 260 and thread control unit 320. Shader 370 may output processed samples to texture pipeline 375 via a fixed function unit 380 or to register file 350. When cube map coordinates are output by shader 370, fixed function unit 380 identifies the face of the cube map to be read from, as described in conjunction with FIG. 4. Fixed function unit 380 provides the face identifier and cube map coordinates to texture pipeline 375. Texture pipeline 375 is configured to read data from texture maps stored in graphics memory using texture map coordinates, such as cube map coordinates, provided by shader 470 and produce textured fragments.

A single program may be used to process several sets of samples. Thread control unit 320 receives samples or pointers to samples stored in pixel input buffer 215 and vertex input buffer 220. Thread control unit 320 receives a pointer to a program to process one or more samples. Thread control unit 320 assigns a thread to each sample to be processed. A thread includes a pointer to a program instruction (program counter), such as the first instruction within the program, thread state information, and storage resources for storing intermediate data generated during processing of the sample. Thread state information is stored in a TSR (Thread Storage Resource) 325. TSR 325 may be a register file, FIFO, circular buffer, or the like. An instruction specifies the location of source data needed to execute the instruction. Source data, such as intermediate data generated during processing of the sample is stored in a register file 350. In addition to register file 350, other source data may be stored in pixel input buffer 215 or vertex input buffer 220. In an alternate embodiment of the present invention, source data is stored in local memory 140, locations in host memory 112, and the like.

Alternatively, in an embodiment permitting multiple programs for two or more thread types, thread control unit 320 also receives a program identifier specifying which one of the two or more programs the program counter is associated with. Specifically, in an embodiment permitting simultaneous execution of four programs for a thread type, two bits of thread state information are used to store the program identifier for a thread. Multithreaded execution of programs is possible because each thread may be executed independent of other threads, regardless of whether the other threads are executing the same program or a different program. Instruction scheduler 430 updates each program counter associated with the threads in thread control unit 320 following the execution of an instruction. For execution of a loop, call, return, or branch instruction the program counter may be updated based on the loop, call, return, or branch instruction.

FIG. 3 is a block diagram of an embodiment of the execution pipeline of FIG. 1 in accordance with one or more aspects of the present invention. Thread control unit 320 includes a TSR 325 to retain thread state data. In one embodiment of the present invention, TSR 325 stores thread state data for each of at least two thread types, where the at least two thread types may include pixel, primitive, and vertex. Thread state data for a thread may include, among other things, a program counter, a busy flag that indicates if the thread is either assigned to a sample or available to be assigned to a sample, a pointer to a source sample to be processed by the instructions associated with the thread or the output pixel position and output buffer ID of the source sample to be processed, and a pointer specifying a destination location in vertex output buffer 260 or pixel output buffer 270. Additionally, thread state data for a thread assigned to a sample may include the sample type, e.g., pixel, vertex, primitive, or the like. The type of data a thread processes identifies the thread type, e.g., pixel, vertex, primitive, or the like. For example, a thread may process a primitive, producing a vertex. After the vertices are processed and fragments are generated, the thread may process a fragment.

Source samples are stored in either pixel input buffer 215 or vertex input buffer 220. Thread allocation priority, as described further herein, is used to assign a thread to a source sample. A thread allocation priority is specified for each sample type and thread control unit 320 is configured to assign threads to samples or allocate locations in a register file 350 based on the priority assigned to each sample type. The thread allocation priority may be fixed, programmable, or dynamic. Specifically, the thread allocation priority may be tuned such that the number of pending pixels produced by processing vertex threads is adequate to achieve maximum utilization of the computation resources in execution pipelines 240 processing pixel threads.

Once a thread is assigned to a source sample, the thread is allocated storage resources such as locations in a register file 350 to retain intermediate data generated during execution of program instructions associated with the thread. Alternatively, source data is stored in storage resources including local memory 140, locations in host memory 112, and the like.

A thread selection unit 315 reads one or more thread entries, each containing thread state data, from thread control unit 320. Thread selection unit 315 may read thread entries to process a group of samples. For example, in one embodiment a group of samples, e.g., a number of vertices defining a primitive, four adjacent fragments arranged in a square, or the like, are processed simultaneously. In the one embodiment computed values such as derivatives are shared within the group of samples thereby reducing the number of computations needed to process the group of samples compared with processing the group of samples without sharing the computed values.

In multithreaded processing unit 300, a thread execution priority is specified for each thread type and thread selection unit 315 is configured to read thread entries based on the thread execution priority assigned to each thread type. A Thread execution priority may be fixed, programmable, or dynamic. Specifically, the thread execution priority may be tuned such that the number of pending pixels produced by processing vertex threads is adequate to achieve maximum utilization of the computation resources in execution pipelines 240 processing pixel threads.

Thread selection unit 315 reads one or more thread entries based on thread execution priorities and outputs selected thread entries to instruction cache 310. Instruction cache 310 determines if the program instructions corresponding to the program counters and sample type included in the thread state data for each thread entry are available in instruction cache 310. When a requested program instruction is not available in instruction cache 310 it is read (possibly along with other program instructions stored in adjacent memory locations) from graphics memory. A base address, corresponding to the graphics memory location where a first instruction in a program is stored, may be used in conjunction with a program counter to determine the location in graphics memory where a program instruction corresponding to the program counter is stored. In an alternate embodiment, instruction cache 310 can be shared between multithreaded processing units 300 within execution pipeline 240.

The program instructions corresponding to the program counters from the one or more thread entries are output by instruction cache 310 to a scheduler, instruction scheduler 330. The number of instructions output each clock cycle from instruction cache 310 to instruction scheduler 330 can vary depending on whether or not the instructions are available in the cache. The number of instructions that can be output each clock cycle from instruction cache 310 to instruction scheduler 330 may also vary between different embodiments. In one embodiment, instruction cache 310 outputs one instruction per clock cycle to instruction scheduler 330. In an alternate embodiment, instruction cache 310 outputs a predetermined number of instructions per clock cycle to instruction scheduler 330.

Instruction scheduler 330 contains storage resources to store a predetermined number of instructions. Each clock cycle, instruction scheduler 330 evaluates whether any of the stored instructions can be executed based on the availability of computation resources in shader 370 and source data stored in register file 350. An instruction specifies the location of source data needed to execute the instruction. In addition to register file 350, other locations of source data include pixel input buffer 215, vertex input buffer 220, locations in local memory 140, locations in host memory 112, and the like. A resource tracking unit, resource scoreboard 360, tracks the status of source data stored in registers in register file 350. Specifically, registers scheduled to be written during processing, i.e., destination registers, are marked as "write pending". When a destination register is written, its status is updated and the "write pending" mark is removed. In one embodiment a destination register is marked as "write pending" by setting a bit in resource scoreboard 360 corresponding to the destination register. The bit is cleared when the destination register is written, indicating that data stored in the register is available to be used as source data. Similarly, resource scoreboard 360 may also track the availability of the computation resources in a shader 370.

When instruction scheduler 330 determines which instructions and associated threads will be executed, instruction scheduler 330 processes loop, call, return, or branch instructions using Sequencer 425. Sequencer 425 determines a program counter associated with a thread executing a loop, call, return, or branch instruction. For example, execution of a branch instruction may result in a program counter changing to a different value, either earlier or later in the program when the branch is taken. Instruction scheduler 330 outputs an updated program counter to thread control unit 320. Alternatively, instruction scheduler 330 outputs a difference value to update the program counter in thread control unit 320.

For execution of other instructions (not loop call, return, or branch instructions) instruction scheduler 330 updates destination register status and computation resource availability in resource scoreboard 360 as needed, and increments each program counter in thread control unit 320 associated with a thread output to instruction dispatcher 340 to point to the next instruction in the thread. In this manner, instruction scheduler 330 is able to schedule the execution of the instructions associated with each thread such that the processing of a sample is one or more instructions ahead of the processing of another sample. As a result of instruction scheduler 330 not being constrained to schedule instructions for execution on each sample within a set of data synchronously, the program counter for each thread may vary from program counters for other threads.

Source data specified in an instruction is gathered from pixel input buffer 215, vertex input buffer 220 or register file 350 for processing by shader 370. Alternatively, source data may be gathered from local memory 140, host memory 112, or the like. Shader 370 is configured by the program instruction to simultaneously process samples by performing operations such as linear interpolation, derivative calculation, blending, and the like, and output the processed sample to a destination specified by the instruction. Instructions that specify texture map coordinates for processing by texture pipeline 375 to read texture map data. The destination may be vertex output buffer 260, pixel output buffer 270, or register file 350. Alternatively, the destination may also include local memory 140, host memory 112, or the like. Shader 370 can simultaneously process samples of different types, and, likewise, execute threads of different types.

When execution of an instruction is complete, shader 370 updates resource scoreboard 360 to indicate that destination registers are written and the computation resources used to process the instruction are available. In an alternate embodiment of the present invention, resource scoreboard 360 snoops an interface between shader 370 and register file 350 to update register status.

When the program instructions associated with a thread have completed execution, the storage resources allocated to retain intermediate data generated during execution of the thread become available for allocation to another thread, i.e., the storage resources are deallocated and the thread is flagged as available in thread control unit 320. When a program instruction stored in instruction cache 310 has completed execution on each sample within the one or more sets that the program instruction is programmed to process, the program instruction is retired from instruction cache 310 (by being overwritten).

Figure 4:
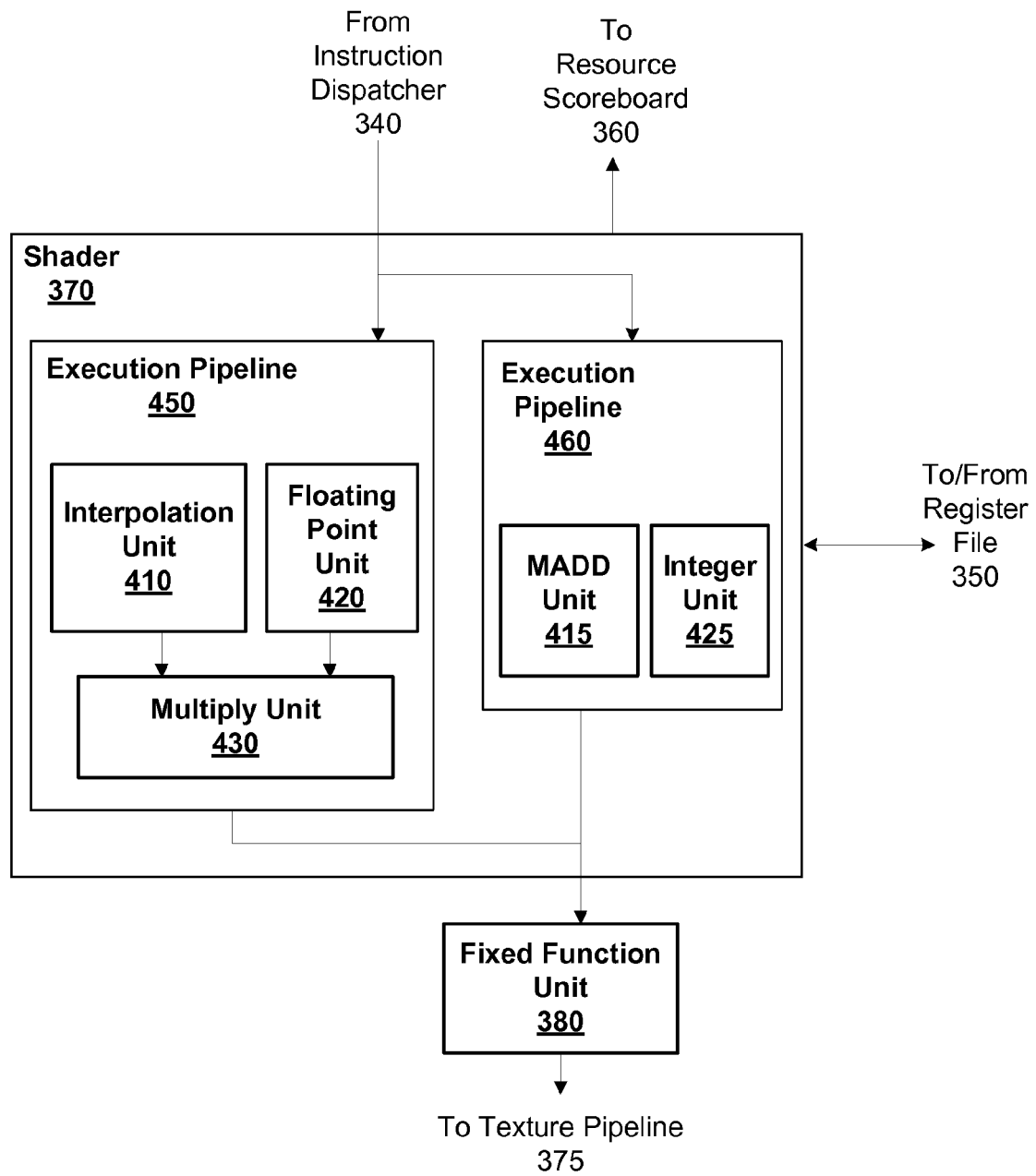
FIG. 4 is a block diagram of an embodiment of the shader and fixed function unit of FIG. 3 in accordance with one or more aspects of the present invention.

FIG. 4 is a block diagram of an embodiment of shader 370 and fixed function unit 380 of FIG. 3, in accordance with one or more aspects of the present invention. Shader 370 includes two execution pipelines, execution pipeline 450 and 460. Instructions received from instruction dispatcher 340 may be scheduled for execution by execution pipeline 450 or 460. Execution pipeline 450 includes an interpolation unit 410, a programmable floating point unit 420 and a multiply unit 430. Execution pipeline 460 includes a MADD (multiply-accumulate) unit 415 and an integer unit 425. Although the present invention involves systems and methods related to shader program instructions for execution by shader 370 to process fragments, shader 370 may also be used to process program instructions to process other types of samples. Furthermore, shader 370 may include additional processing units, execution pipelines, multiple interpolation units 410, floating point units 420, multiply units 430, MADD units 415, and integer units 425.

Shader 370 receives shader program instructions from instruction dispatcher 340, including instructions inserted into a program by compiler 113. Shader 370 also receives fragment data, including source cube map coordinates, plane equation coefficients, and the like, from other units (not shown). Shader 370 may read fragment data from register file 350. Interpolation unit 410 may be configured by shader program instructions to interpolate attributes, e.g., color, depth, texture coordinates, or the like, by evaluating plane equations using coefficients provided by instruction dispatcher 340.

Execution pipeline 450 receives fragment data, including the source cube map coordinates (optionally interpolated by interpolation unit 410) and is configured by shader program instructions to process the source cube map coordinates and produce cube map coordinates that may be used by texture pipeline 375 to read cube map data from a face of a cube map. Execution pipeline 450 may also be configured to perform other graphics processing operations. In some embodiments of the present invention, programmable floating point unit 420 is configured to perform multiplication, division, reciprocal, addition, and other operations for floating point values of 16 bits or greater.

Fixed function unit 380 receives cube map coordinates from execution pipeline 450 and the source cube map coordinates and identifies the face of the cube map from which the cube map data should be read. Fixed function unit 380 passes the cube map coordinates produced by execution pipeline 450 through to texture pipeline 375 or register file 350 along with the face of the cube map. Unlike interpolation unit 410, floating point unit 420, MADD unit 415, multiply unit 430, and integer unit 425, fixed function unit 380 is not programmable. When fixed function unit 380 receives cube map coordinates from shader 370, fixed function unit 380 identifies the cube map face that the cube map coordinates should be used by texture pipeline 375 to read cube map data from. Fixed function unit 380 is needed because shader 370 does not output an identifier for the cube map face. In some embodiments of the present invention, fixed function unit 380 is configured to execute a shader program instruction to perform the computations necessary to identify the cube map face.

Cube mapping can be thought of as taking a three-dimensional vector $P=(s,t,r)$ with its origin at the center of a cube. The three-dimensional vector is represented by the source cube map coordinates received by shader 370. The vector is scaled to compute $Q=(s',t',r')$ such that the other end of the vector lies on a face of the cube, thereby selecting that face of the cube as the two-dimensional texture from which texture data is read by texture pipeline 375. The scaling is performed by execution pipeline 450 which computes $Q=P/\max(|s|, |t|, |r|)$. At least one of the components of Q, e.g., s', t', or r', is either $-1$ or $+1$, and has the maximum absolute value of $+1$. The component with the maximum value indicates the cube map face from which data should be read. The other two components range in value from $-1$ and $+1$, and are used as the two dimensional coordinates within the cube map face, i.e., the cube map coordinates. When more than one of the components is either $-1$ or $+1$, a predetermined search order is used to select one of the components as the component with the maximum value.

In order to compute Q, execution pipeline 450 first identifies the cube map face by determining the coordinate with the maximum absolute value. Rather than passing information indicating the cube map face to fixed function unit 380, fixed function unit 380 is also configured to identify the cube map face. Therefore, execution pipeline 450 may be used without modification to support cube mapping and the cube mapping operations are distributed between floating point unit 420 and fixed function unit 380. Instruction scheduler 330 may schedule additional shader program instructions for execution by floating point unit 420, multiply unit 430, and fixed function unit 380 to better utilize the processing capacity of those units without using a portion of the die area for circuitry dedicated to performing cube mapping operations. Performing cube mapping operations by executing shader program instructions in general purpose floating point and fixed function units may improve the utilization of computational resources and graphics processing performance.

Figure 5:
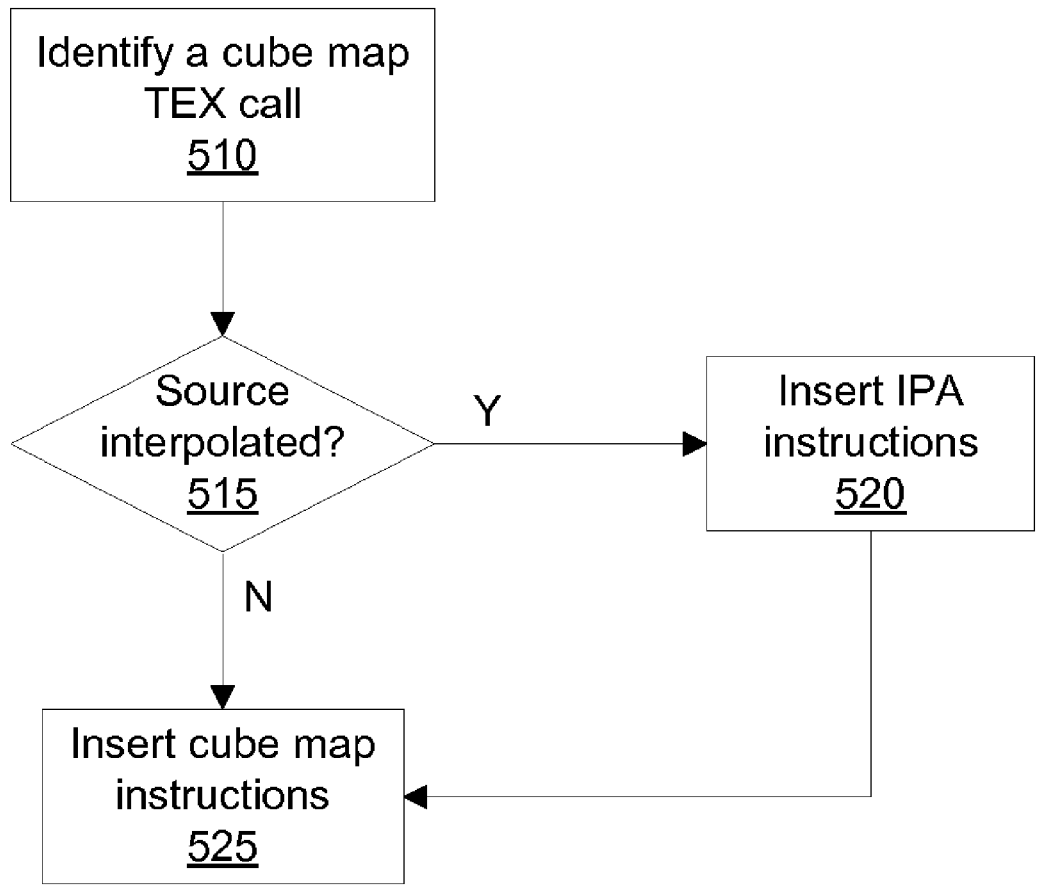
FIG. 5 is a flow diagram of an exemplary embodiment of compiling a shader program including cube mapping in accordance with one or more aspects of the present invention.

FIG. 5 is a flow diagram of an exemplary embodiment of compiling a shader program including cube mapping, in accordance with one or more aspects of the present invention. Compiler 113 may replace a texture call for reading cube map data that is intended for execution by dedicated cube mapping circuitry with a sequence of shader program instructions for execution by shader 370. In step 510 compiler 113 identifies a texture call, TEX, for reading cube map data. In step 515 compiler 113 determines if the TEX call specifies that the source cube map coordinates should be interpolated, and, if not, compiler 113 proceeds directly to step 525. Otherwise, in step 520 compiler 113 inserts interpolation instructions, i.e. IPA instructions, for execution by interpolation unit 410. The IPA instruction may specify an optional multiplication operation in addition to the interpolation operation. For example, "IPA a" performs an interpolation of a and "IPA a, b" performs an interpolation of a scaled by b. The code shown in TABLE 1 represents a sequence of shader program instructions including inserted IPA instructions.

TABLE 1

| | |
|---|---|
| IPA Rw, iw; | // Interpolate (1/w) |
| RCP Rw, Rw | // w = 1/iw |
| IPA Rs, Rw; | // Interpolate (s/w) * w |
| IPA Rt, Rw; | // Interpolate (t/w) * w |
| IPA Rr, Rw; | // Interpolate (r/w) * w |
| tmp = MAX (\|Rs\|, \|Rt\|, \|Rr\|); | |
| Rs /= tmp; | // normalize |
| Rt /= tmp; | // normalize |
| Rr /= tmp; | // normalize |

Rs, Rt, and Rr specify the destination registers to store the cube map coordinates. Rw is an operand specifying the register that stores the source cube map coordinates of w, where w is usually related to the distance of the sample from the view point. The interpolation function evaluates Ax+By +C, where A, B, and C are plane equation coefficients and (x,y) is the screen space position of the pixel being processed. Each attribute, e.g., s, t, r, and the like, has a set of A, B, and C coefficients that are computed based on the attribute values at the vertices of a primitive, e.g., triangle.

In step 525 compiler 113 replaces the TEX call with a sequence of shader program instructions for execution by programmable floating point unit 420, fixed function unit 380, and texture pipeline 375. The code shown in TABLE 2 represents a set of shader program instructions that may be inserted into a shader program in step 525, where s, t, and r are the source cube map coordinates received by shader 370. When the IPA instructions are used, s, t, and r, are replaced with interpolation unit 410 outputs Rs, Rt, and Rr, respectively. The FACE instruction is executed by fixed function unit 380 to determine the face of the cube map and swizzle the non-face cube map coordinates for reading the cube map data from the face. Fixed function unit 380 outputs a vector TMP that includes the cube map face coordinate and the two remaining cube map coordinates. In some embodiments of the present invention, the FACE instruction is not explicitly inserted into the sequence of shader program instructions by compiler 113. Instead, fixed function unit 380 determines that texture coordinates output by shader 370 are cube map coordinates, and fixed function unit 380 performs the operations of the FACE instruction to produce TMP for output to texture pipeline 375.

TABLE 2

| |
|---|
| MAX R4, \|s\|, \|t\|; |
| MAX R4, R4, \|r\|; |
| RCP R4, R4; |
| MUL Rs, s, R4; |
| MUL Rt, t, R4; |
| MUL Rr, r, R4; |
| FACE (TMP, Rs, Rt, Rr); |
| TEX (TMP[3]); |

Figure 6:
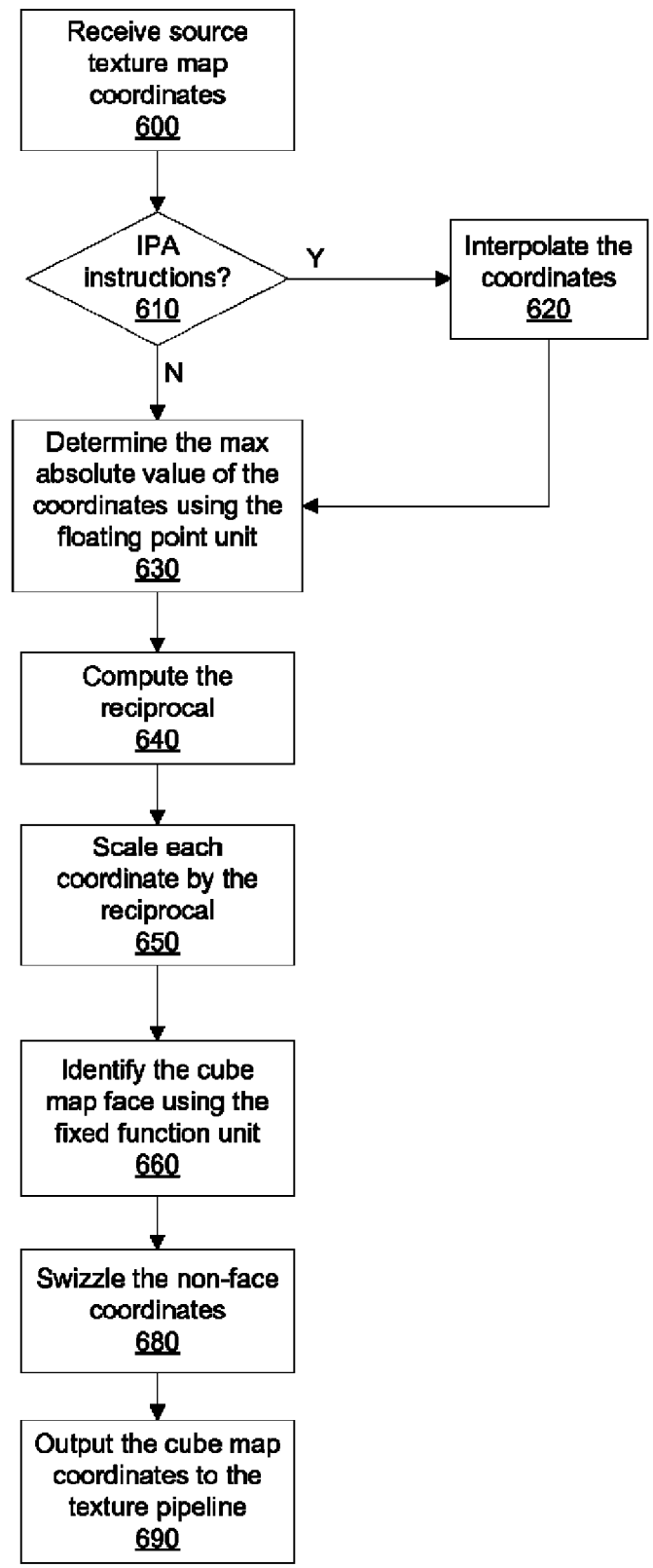
FIG. 6 is a flow diagram of an exemplary embodiment of executing a shader program for cube mapping in accordance with one or more aspects of the present invention.

FIG. 6 is a flow diagram of an exemplary embodiment of shader 370 executing a shader program for cube mapping, in accordance with one or more aspects of the present invention. In step 600 shader 370 receives source cube map coordinates, including s, t, r, and w. In step 610 shader 370 determines if IPA instructions are present, and, if so, in step 620 interpolation unit 410 interpolates the source cube map coordinates and provides interpolated source cube map coordinates to programmable floating point unit 420. If, in step 610 shader 370 determines that IPA instructions are not present, then shader 370 proceeds directly to step 630.

In step 630 programmable floating point unit 420 within shader 370 determines the maximum absolute value of the (interpolated) source cube map coordinates to identify the face of the cube map. In step 640 programmable floating point unit 420 computes the reciprocal of the maximum absolute value. In step 650 programmable floating point unit 420 scales each of the (interpolated) source cube map coordinates by the reciprocal to produce the cube map coordinates.

In step 660 fixed function unit 380 identifies the face of the cube map by repeating a portion of the operations performed by programmable floating point unit 420 in step 630. In particular, fixed function unit 380 compares the source cube map coordinates as integers to identify the maximum source cube map coordinate as the face of the cube map. The code shown in TABLE 3 represents the function performed when fixed function unit 380 executes the FACE instruction, where Rs, Rt, Rr are replaced with X, Y, and Z. By way of illustration, the code is defined using Cg or HLSL (high-level shader language). However, any other language may be used to define the function.

TABLE 3

| |
|---|
| if ( Z != NaN AND Z > X AND Z > Y ) |
|     if( Z >= 0 ) |
|         face = POSITIVE_Z |
|         X = X; Y = Y |
|     else |
|         face = NEGATIVE_Z |
|         X = -X; Y = Y |
|     endif |
| else if ( Y != NaN AND Y > X AND Y > Z ) |
|     if ( Y >= 0 ) |
|         face = POSITIVE_Y |
|         X = X; Y = -Z |
|     else |
|         face = NEGATIVE_Y |
|         X = X; Y = Z |
|     endif |
| else if ( X != NaN AND X > Y AND X > Z ) |
|     if ( X >= 0 ) |
|         face = POSITIVE_X |
|         X = -Z; Y = Y |
|     else |
|         face = NEGATIVE_X |
|         X = Z; Y = Y |
|     endif |
| else |
|     face = POSITIVE_Z |
|     X = X; Y = Y |
| endif |

In step 680 fixed function unit 380 swizzles the non-face cube map coordinates to order the cube map coordinates for input to texture pipeline 375. In other embodiments of the present invention, step 660 may be omitted and programmable floating point unit 420 provides the information indicating the cube map face to texture pipeline 375 directly. In step 690 shader 370 outputs the cube map coordinates (via fixed function unit 380) and fixed function unit 380 outputs the information indicating the cube map face that the cube map data should be read from (face from TABLE 3) to texture pipeline 375. Texture pipeline 375 reads the texture data from the cube map face using the non-face cube map coordinates.

Instruction scheduler 330 may schedule shader program instructions for performing cube mapping operations and additional shader program instructions for execution by programmable floating point unit 420 and fixed function unit 380 to better utilize the processing capacity of those units without dedicating a portion of the die area for circuitry that is only used to perform cube mapping operations. Performing cube mapping operations by executing shader program instructions in general purpose floating point and fixed function units may improve the utilization of computational resources and graphics processing performance. Persons skilled in the art will appreciate that any system configured to perform the method steps of FIG. 5 or 6, or their equivalents, is within the scope of the present invention.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method for compiling program instructions to compute cube map coordinates using a shader, comprising:
    receiving a set of program instructions by a compiler that is stored in a memory and executed by a processor;
    identifying, by the compiler, a first texture call for reading cube map data from a cube map in the set of program instructions, the first texture call intended for execution by dedicated cube mapping circuitry that is specifically designed to perform cube mapping computations and is idle when cube mapping operations are not being performed;
    replacing, by the compiler, the first texture call with a first sequence of shader program instructions to compute the cube map coordinates and a second texture call that specifies the cube map coordinates as an operand to produce a modified set of program instructions that read the cube map data from a face of the cube map, wherein a fixed function unit is configured to identify the face of the cube map and output a first cube map coordinate that indicates the face of the cube map and two remaining cube map coordinates when the first sequence of shader program instructions is executed by a general purpose programmable floating point unit within a programmable graphics pipeline that does not include the dedicated cube mapping circuitry; and
    storing the modified set of program instructions in the memory.

2. The method of claim 1, wherein the first sequence of shader program instructions are configured for execution by the general purpose floating point unit within the shader to produce the cube map coordinates.

3. The method of claim 2, wherein the first sequence of shader program instructions includes shader program instructions configured to compute a maximum absolute value of the cube map coordinates to identify the face of the cube map.

4. The method of claim 3, wherein the first sequence of shader program instructions includes a shader program instruction configured to compute a reciprocal of the maximum absolute value to read the cube map data from the face of the cube map.

5. The method of claim 4, wherein the first sequence of shader program instructions includes shader program instructions configured to scale cube map coordinates of the face of the cube map by the reciprocal of the maximum absolute value to read the cube map data from the face of the cube map.

6. The method of claim 1, further comprising inserting an additional shader program instruction to configure the fixed function unit to identify the face of the cube map using the cube map coordinates produced by the general purpose floating point unit.

7. The method of claim 1, further comprising the step of inserting interpolation instructions for execution by an interpolation unit within the shader when source texture coordinates provided to the first texture call are interpolated by the set of program instructions.

8. A method for computing cube map coordinates using a shader, comprising:
    receiving source cube map coordinates by the shader that is within a programmable graphics pipeline that does not include dedicated cube mapping circuitry;
    executing a first set of shader program instructions using a general purpose floating point unit within the shader to determine a maximum absolute value of the source cube map coordinates to identify a face of a cube map;
    executing a second set of shader program instructions using the general purpose floating point unit to process the source cube map coordinates and the maximum absolute value, and produce cube map coordinates for reading cube map data from the face of the cube map; and
    identifying the face of the cube map using a fixed function processing unit and outputting a first cube map coordinate that indicates the face of the cube map and two remaining cube map coordinates when the general purpose floating point unit executes the first set of shader program instructions and produces the cube map coordinates.

9. The method of claim 8, wherein the first set of shader program instructions and the second set of shader program instructions are inserted into the shader program when the shader program is compiled for execution based on specific capabilities of the programmable graphics pipeline.

10. The method of claim 8, further comprising reading the cube map data from the face of the cube map using the first cube map coordinate that indicates the face of the cube map and two remaining cube map coordinates.

11. The method of claim 8, further comprising executing a third set of shader program instructions using the general purpose floating point unit to interpolate the source cube map coordinates.

12. A system for computing cube map coordinates using shader program instructions, comprising:
    a general purpose programmable floating point unit that is within a programmable graphics pipeline that does not include the dedicated cube mapping circuitry and configured to receive source cube map coordinates and execute a first portion of the shader program instructions to produce the cube map coordinates for reading cube map data from a face of a cube map; and
    a fixed function processing unit coupled to the general purpose programmable floating point unit and configured to identify the face of the cube map used to read the cube map data and outputting a first cube map coordinate that indicates the face of the cube map and two remaining cube map coordinates when the general purpose programmable floating point unit executes the first set of shader program instructions and outputs the cube map coordinates.

13. The system of claim 12, further comprising an instruction scheduler configured to schedule the shader program instructions and additional shader program instructions for execution by the general purpose programmable floating point unit based on the availability of computation resources in the general purpose programmable floating point unit.

14. The system of claim 12, wherein the fixed function integer processing unit is further configured to swizzle the cube map coordinates and produce swizzled cube map coordinates for reading the cube map data based on the identification of the face of the cube.

15. The system of claim 14, further comprising a texture pipeline configured to read the cube map data from the face of the cube map using the swizzled cube map coordinates.

16. The system of claim 12, further comprising an interpolation unit coupled to the general purpose programmable floating point unit and configured to execute a second portion of the shader program instructions to interpolate the source cube map coordinates and provide interpolated source cube map coordinates to the general purpose programmable floating point unit.

17. The system of claim 12, further comprising a compiler configured to replace a first texture call with the first portion of the shader program instructions and a shader program instruction to read the cube map data from the face of the cube map, the first texture call intended for execution by the dedicated cube mapping circuitry that is specifically designed to perform cube mapping computations.

18. The system of claim 17, wherein the compiler is configured to insert an additional program instruction that configures the fixed function unit to identify the face of the cube map when the additional program instruction is executed.

19. The system of claim 12, wherein the first portion of the shader program instructions configure the general purpose programmable floating point unit to identify the face of the cube map by computing an absolute maximum value of the source cube map coordinates.

20. The system of claim 12, wherein the general purpose programmable floating point unit does not output the first cube map coordinate that indicates the face of the cube map.

* * * * *